United States Patent [19]  [11] 3,958,999
Izumitani et al.  [45] May 25, 1976

[54] OPTICAL GLASS

[75] Inventors: Tetsuro Izumitani, Hino; Hiroji Sagara, Tokyo, both of Japan

[73] Assignee: Hoya Glass Works, Ltd., Tokyo, Japan

[22] Filed: Jan. 3, 1975

[21] Appl. No.: 538,483

Related U.S. Application Data

[63] Continuation of Ser. No. 274,381, July 24, 1972, abandoned.

[30] Foreign Application Priority Data

July 30, 1971 Japan.............................. 46-57246
Sept. 16, 1971 Japan.............................. 46-71981

[52] U.S. Cl................. 106/47 Q; 106/53; 106/54; 106/47 R
[51] Int. Cl.²..................... C03C 3/04; C03C 3/10; C03C 3/08; C03C 3/00
[58] Field of Search............. 106/47 Q, 53, 54, 47 R

[56] References Cited
UNITED STATES PATENTS

| | | | |
|---|---|---|---|
| 2,678,281 | 5/1954 | Geffcker | 106/53 |
| 2,899,322 | 8/1959 | Bromer et al. | 106/47 Q |
| 2,996,392 | 8/1961 | Bromer et al. | 106/47 Q |
| 3,006,776 | 10/1961 | Geffcker et al. | 106/47 Q |
| 3,074,805 | 1/1963 | Geffcker et al. | 106/47 Q |
| 3,081,178 | 3/1963 | Weissenberg et al. | 106/47 Q |
| 3,320,170 | 5/1967 | Vickey et al. | 106/47 R |
| 3,563,773 | 2/1971 | Bromer et al. | 106/54 |
| 3,615,762 | 10/1971 | Parry et al. | 106/47 Q |
| 3,615,769 | 10/1971 | Leitz et al. | 106/54 |
| R21,175 | 8/1939 | Morey | 106/54 X |

FOREIGN PATENTS OR APPLICATIONS

| | | | |
|---|---|---|---|
| 1,061,976 | 7/1959 | Germany | 106/54 |
| 1,047,994 | 12/1958 | Germany | 106/47 Q |
| 958,150 | 2/1957 | Germany | 106/47 Q |
| 1,529,337 | 5/1968 | France | 106/47 Q |
| 858,365 | 1/1961 | United Kingdom | 106/47 Q |
| 1,196,339 | 6/1970 | United Kingdom | 106/47 Q |
| 1,113,229 | 5/1968 | United Kingdom | 106/47 Q |

OTHER PUBLICATIONS

Abs. 700,156, 12/1949, DePaolis.

*Primary Examiner*—Winston A. Douglas
*Assistant Examiner*—Mark Bell
*Attorney, Agent, or Firm*—Sughrue, Rothwell, Mion, Zinn & Macpeak

[57] ABSTRACT

A thorium oxide-free $B_2O_3$—$La_2O_3$—$Gd_2O_3$—$Ta_2O_5$ system optical glass is improved in stability to devitrification and in optical constants by introducing at least one of a divalent metal oxide such as ZnO, CdO, PbO, BaO, SrO, CaO, and MgO into the optical glass composition or replacing $Ta_2O_5$ of the optical glass composition with a divalent metal oxide. If desired, the glass may be free of CdO.

12 Claims, No Drawings

OPTICAL GLASS

This is a continuation of application Ser. No. 274,381, filed July 24, 1972, now abandoned.

BACKGROUND OF THE INVENTION

1. Field of the Invention

The present invention relates to a thorium oxide-free and, if desired, a cadmium oxide-free optical glass having improved optical constants $n_d$ and $\nu_d$. In particular, the invention relates to thorium oxide-free optical glass having optical constants of 1.59–1.91 for $n_d$ and 62–19 for $\nu_d$.

2. Description of the Prior Art

Various high refractive and low dispersive optical glasses have hitherto been reported, but many of them contain thorium oxide which is poisonous to humans because of its radioactivity. However, when they are free of thorium oxide, the content of a single component such as $La_2O_3$ becomes markedly larger and thus the tendency toward devitrification is increased, which makes the mass production of such glasses difficult.

It was successful to obtain a thorium oxide-free and stable optical glass by replacing a part or the entire amount of $La_2O_3$ with $Gd_2O_3$. That is, because the properties of $Gd_2O_3$ are similar to those of $La_2O_3$, a part of or the entire amount of $La_2O_3$ of an optical glass can be replaced with $Gd_2O_3$ without changing the optical properties. Thus, by preventing an increase in the tendency toward devitrification caused by the use of a large amount of $La_2O_3$, the optical glass can be both stabilized with respect to devitrification and the vitrification range can be enlarged. It, in fact, becomes possible to obtain optical glasses possessing improved optical constants that are not present in conventional optical glasses.

As a glass composition containing $Gd_2O_3$, a $B_2O_3$—$La_2O_3$—$Gd_2O_3$—$Ta_2O_5$ system is already known from the specification of French Pat. No. 1,529,337, and an optical glass possessing a large vitrification range and improved optical constants which are not present in conventional optical glasses can be obtained. However, such a glass is lacking in satisfactory stability to devitrification, and even if the most stable composition disclosed in the above patent is employed, the optical glass is not so stable that it can be produced on an industrial scale.

Furthermore, if the content of $B_2O_3$ in the $B_2O_3$—$La_2O_3$—$Gd_2O_3$—$Ta_2O_5$ system glass is high, the glass tends to have phase separation. Accordingly, an optical glass having a refractive index $n_d$ of lower than 1.76 has a strong tendency towards devitrification and it has hitherto been difficult to obtain a high refractive and low dispersive optical glass in the refractive index range.

SUMMARY OF THE INVENTION

The inventors have succeeded, in one embodiment of this invention, in increasing the stability of the $B_2O_3$—$La_2O_3$—$Gd_2O_3$—$Ta_2O_5$ system optical glass by introducing a divalent metal oxide or oxides (RO, wherein R is a divalent metal) to the optical glass system, and thus an optical glass possessing excellent optical constants never before obtained in the $B_2O_3$—$La_2O_3$—$Gd_2O_3$—$Ta_2O_5$ system glass has been obtained.

Moreover, the inventors have also succeeded, in another embodiment of this invention, in increasing the stability of the $B_2O_3$—$La_2O_3$—$Gd_2O_3$—$Ta_2O_5$ system optical glass by replacing the $Ta_2O_5$ with divalent metal oxides (RO). That is, by providing the specific $B_2O_3$—$La_2O_3$—$Gd_2O_3$—RO system optical glass according to one embodiment of this invention, a high refractive and low dispersion optical glass possessing a high stability to devitrification can be obtained in a range of a comparatively low refractive index.

Furthermore, a conventional optical glass possessing the optical constants of 1.68–1.86 for $n_d$ and 53–27 for $\nu_d$ contains CdO as a necessary component and the powder of the CdO-containing glass formed in the polishing of the glass is poisonous to humans, but in both embodiments of this invention it is possible to provide a CdO-free optical glass possessing the aforesaid ranges of optical constants.

DETAILED DESCRIPTION OF THE INVENTION

That is, according to one embodiment of this invention, there is provided a $ThO_2$-free and, if desired, a CdO-free optical glass having a composition of 18 to 60% by weight $B_2O_3$ + $SiO_2$, the content of the $SiO_2$ being, however, 0 to 23% by weight; 0 to 50% by weight $La_2O_3$, 2 to 50% by weight $Gd_2O_3$, 2 to 30 % by weight $Ta_2O_5$, 0 to 50% by weight ZnO, 0 to 53% by weight, CdO, 0 to 60% by weight PbO, 0 to 50% by weight BaO, 0 to 45% by weight SrO, 0 to 30% by weight CaO, 0 to 20% by weight MgO, the content of the ZnO + CdO + PbO + BaO + SrO+ CaO + MgO being 2 to 60% by weight, 0 to 16% by weight $Al_2O_3$, 0 to 9% by weight $ZrO_2$, 0 to 10% by weight $TiO_2$, 0 to 26% by weight $Nb_2O_5$, 0 to 15% by weight $WO_3$, and 0 to 18% by weight $Y_2O_3$. The optical glass of this invention is quite stable to devitrification, has optical constants of 1.62–1.91 for $n_d$ and 59–27 for $\nu_d$, and can be easily produced on a large scale.

Now, as is well-known, $B_2O_3$ and $SiO_2$ are glass forming oxides and if the sum of these oxides is higher than 60%, phase separation occurs, while if the sum is less than 18%, devitrification of the optical glass occurs. Furthermore, the $SiO_2$ contributes to increasing the viscosity of the molten glass and to prevent the occurrence of devitrification of the glass, but if the content of the $SiO_2$ is higher than 23%, the melting point of the glass batch is increased and further the tendency toward devitrification is increased.

$La_2O_3$ and $Gd_2O_3$ are used for increasing the refractive index and the Abbe number, but if the content of $La_2O_3$ and $Gd_2O_3$ is higher than 50%, a great tendency toward devitrification occurs, and if the content is less than 2%, the optical constants as described above cannot be obtained.

To obtain a particularly stable optical glass, it is desirable that the $Gd_2O_3$ be present in almost the same amount (by weight %) as the amount of $La_2O_3$.

$Ta_2O_5$ has a glass-forming function and is profitable in a composition containing a low proportion of the above-described glass forming oxides, and is necessary for maintaining a high refractive index in the optical glass composition in the embodiment of this invention described above. However, if the content of $Ta_2O_5$ is too large, the devitrification tendency increases. Thus, the content thereof is less than 30%. In the embodiment of this invention, however, the desired optical constants cannot be obtained if the $Ta_2O_5$ content is less than 2%.

The divalent metal oxides are necessary components for stabilizing the optical glass toward devitrification, but if the content of ZnO is higher than 50%, CdO is higher than 53%, PbO is higher than 60%, BaO is higher than 50%, SrO is higher than 45%, CaO is higher than 30%, and MgO is higher than 20%, the glass composition is not vitrified. Furthermore, if the sum of more than two of these divalent metal oxides is above 60%, the composition is not also vitrified, but if the content of at least one of these oxides is lower than 2%, sufficient stability to devitrification cannot be obtained. In order to obtain a high refractive and low dispersive optical glass having particularly excellent optical properties, the presence of ZnO and CdO is effective.

$Al_2O_3$, $ZrO_2$, $TiO_2$, $Nb_2O_5$, and $WO_3$, which are all subsidiary oxides, are added mainly to prevent the devitrification of the glass, to increase the viscosity for improving the glass-forming property, to increase the chemical durability of the glass, and to control the optical constants of the glass. However, if the content of $Al_2O_3$, $Nb_2O_5$, and $WO_3$ is higher than 16%, 26%, and 15%, respectively, the tendency toward devitrification is increased. Also, if the content of $ZrO_2$ is higher than 9%, insoluble precipitates are formed when the feed materials are melted, and if the content of $TiO_2$ is higher than 10%, the color of the glass product is yellow brown, which makes the use of the glass as an optical glass difficult. Because $Y_2O_3$ has almost the same properties as those of $Gd_2O_3$, almost the same refractive index and the Abbe number are obtained as those obtained by the addition of $Gd_2O_3$. Therefore, a part of the $Gd_2O_3$ may be replaced with comparatively inexpensive $Y_2O_3$. The co-presence of $Gd_2O_3$ and $Y_2O_3$ contributes to an increase in the stability of the glass to devitrification, but if the content is above 18%, the glass shows a strong tendency toward devitrifivation.

In particular, to obtain an optical glass having optical constants of 1.76 – 1.86 for $N_d$ and 51 – 35 for $\nu_d$, an optical glass having a composition of 0 to 8% by weight $SiO_2$, 21 to 30% by weight $B_2O_3$, 0 to 3% by weight $Al_2O_3$, 25 to 40% by weight $La_2O_3$, 2 to 25% by weight $Gd_2O_3$, 2 to 20% by weight ZnO, the content of the CdO + PbO + BaO + SrO + CaO + MgO being 0 to 10% by weight, 0 to 6% by weight $ZrO_2$, 2 to 15% by weight $Ta_2O_5$, 0 to 12% by weight $Nb_2O_5$, 0 to 6% by weight $WO_3$, 0 to 3% by weight $TiO_2$, and 0 to 10% by weight $Y_2O_3$, is preferred.

According to another embodiment of the present invention, there is provided a $ThO_2$-free and, if desired, a CdO-free optical glass showing a high stability to devitrification and having a composition (by percent by weight) of 24 to 70% of $B_2O_3 + SiO_2$, the content of the $SiO_2$ being, however, 0 to 25%, 1 to 50% $La_2O_3$, 2 to 50% $Gd_2O_3$, 0 to 56% ZnO, 0 to 61% CdO, 0 to 66% PbO, 0 to 50% BaO, 0 to 40% SrO, 0 to 25% CaO, 0 to 20% MgO, the content of the ZnO + CdO + PbO + BaO + SrO + CaO + MgO being 2 to 66%, 0 to 20% $Al_2O_3$, 0 to 10% $ZrO_2$, 0 to 10% $TiO_2$, 0 to 15% $Nb_2O_5$, 0 to 10% $WO_3$, and 0 to 20% $Y_2O_3$. The optional glass of this invention has optical constants of 1.59 – 1.86 for $n_d$ and 62 – 19 for $\nu_d$.

Now, if the content of the sum of $B_2O_3$ and $SiO_2$ is higher than 70%, phase separation occurs, while if the content is lower than 24%, devitrification is formed. On the other hand, as described above the $SiO_2$ is used to increase the visocity of the molten glass and to prevent the occurrence of devitrification, but if the content of the $SiO_2$ is higher than 25%, the melting temperature of the glass components is increased and the tendency towards devitrification is increased.

Also, if each of the $La_2O_3$ and the $Gd_2O_3$ is higher than 50%, the glass tends to be devitrified greatly, while if the content of the $La_2O_3$ is lower than 1% and that of the $Gd_2O_3$ is lower than 2%, the desired optical constants cannot be obtained. As is the case of the above-described first embodiment of this invention, it is desirable for obtaining a particularly stable optical glass that the $La_2O_3$ be present in almost the same amount as the amount of the $Gd_2O_3$.

If the content of the ZnO is higher than 56%, the CdO is higher than 61%, the PbO is higher than 66%, the BaO is higher than 50%, the SrO is higher than 40%, the CaO is higher than than 25%, and the MgO is higher than 20%, the glass composition is not vitrified. Furthermore, if the sum of more than two oxides is over 66%, the glass composition is not vitrified, while if the content of at least one of these oxides is lower than 2%, sufficient stability to the devitrification cannot be obtained.

Moreover, if the $Al_2O_3$ is higher than 20%, the $Nb_2O_5$ is higher than 15%, and the $WO_3$ is higher than 10%, the tendency toward devitrification is increased. Also, if the content of the $ZrO_2$ is higher than 10%, insoluble precipitates are formed at melting, and if the $TiO_2$ is higher than 10%, the glass is yellow brown and thus it cannot be used as optical glass. The co-presence of $Gd_2O_3$ and $Y_2O_3$ contributes towards increasing the stability to devitrification of glass as described above, but if the content is above 20%, the glass tends to show strong devitrification.

To obtain an optical glass having the optical constants of 1.71 – 1.78 for $n_d$ and 55 – 48 for $\nu_d$, an optical glass having a composition of 1 to 10% by weight $SiO_2$, 28 to 37% by weight $B_2O_3$, 0 to 3% by weight $Al_2O_3$, 27 to 45% by weight $La_2O_3$, 2 to 15% by weight $Gd_2O_3$, 0 to 10% by weight $Y_2O_3$, 2 to 15% by weight ZnO, the content of the CdO + PbO + BaO + SrO + CaO + MgO being 0 to 10% by weight, the content of the $Ta_2O_5$ + $Nb_2O_5$ + $WO_3$ + $TiO_2$ being 0 to 3% by weight, and 0 to 8% by weight $ZrO_2$, is preferred and furthermore, in this case, the co-presence of $Gd_2O_3$ and $Y_2O_3$ contributes to increase the stability to devitrification of the glass as described above.

To obtain an optical glass having the optical constants of 1.68 – 1.73 for $n_d$ and 57 – 52 for $\nu_d$, an optical glass having a composition of 1 to 15% by weight $SiO_2$, 25 to 41% by weight $B_2O_3$, 0 to 8% by weight $Al_2O_3$, 10 to 41% by weight $La_2O_3$, 2 to 25% weight $Gd_2O_3$, 0 to 10% by weight $Y_2O_3$, the content of the CdO + PbO + BaO + SrO + MgO being 0 to 10% by weight, the content of the $Ta_2O_5 + Nb_2O_5 + WO_3 + TiO_2$ being 0 to 3% by weight, and 0 to 5% by weight $ZrO_2$, is preferred.

Furthermore, to obtain an optical glass having the optical constants of 1.62 – 1.69 for $n_d$ and 62 – 55 for $\nu_d$, an optical glass having a composition of 1 to 20% by weight $SiO_2$, 25 to 41% by weight $B_2O_3$, 0 to 10% by weight $Al_2O_3$, 2 to 25% by weight $La_2O_3$, 2 to 15% by weight $Gd_2O_3$, 0 to 10% by weight $Y_2O_3$, the content of the BaO + SrO + CaO + MgO being 10 to 50% by weight, the content of the ZnO, + CaO + PbO being 0 to 10% by weight, the content of the $Ta_2O_5 + Nb_2O_5 + WO_3 + TiO_2$ being 0 to 3% by weight, and 0 to 8% by weight $ZrO_2$, is preferred.

Now, examples of the first embodiment of the optical glass of this invention are shown in Table 1 (each component is shown in weight percent) together with the optical constants:

Table 1

| No. | $B_2O_3$ | $La_2O_3$ | $Gd_2O_3$ | $Ta_2O_5$ | ZnO | CdO | PbO | BaO | SrO | CaO | MgO |
| --- | --- | --- | --- | --- | --- | --- | --- | --- | --- | --- | --- |
| 1 | 18.0 | 32.5 | 12.0 | 17.5 | 5.0 | | | | | | |
| 2 | 21.0 | 32.0 | 20.0 | 25.0 | | 2.0 | | | | | |
| 3 | 22.0 | 18.0 | 20.0 | 20.0 | | | 15.0 | | | | |
| 4 | 22.0 | 28.0 | 15.0 | 5.0 | 10.0 | 5.0 | | | | | |
| 5 | 22.0 | 30.0 | 20.0 | 10.0 | 10.0 | | | | | | |
| 6 | 23.0 | 35.0 | 5.0 | 5.0 | 5.0 | | | | | | |
| 7 | 24.0 | 26.0 | 10.0 | 30.0 | | 10.0 | | | | | |
| 8 | 24.0 | 10.0 | 10.0 | 5.0 | | | | 35.0 | | | |
| 9 | 10.0 | 10.0 | 5.0 | 3.0 | | | | 47.0 | | | |
| 10 | 25.0 | 35.0 | 20.0 | 5.0 | 5.0 | | | | | | |
| 11 | 25.0 | 30.0 | 20.0 | 10.0 | 10.0 | | | | | | |
| 12 | 25.0 | 40.0 | 5.0 | 2.5 | 5.0 | | | | | | |
| 13 | 25.0 | 29.0 | 5.0 | 2.5 | 5.0 | | | | | | |
| 14 | 25.0 | 35.0 | 23.0 | 15.0 | 2.0 | | | | | | |
| 15 | 25.0 | 30.0 | 2.0 | 20.0 | 5.0 | | | | | | |
| 16 | 24.0 | 11.0 | 15.0 | 20.0 | | 30.0 | | | | | |
| 17 | 29.0 | 24.0 | 10.0 | 10.0 | 27.0 | | | | | | |
| 18 | 30.0 | | 50.0 | 5.0 | 15.0 | | | | | | |
| 19 | 30.0 | 38.0 | 20.0 | 2.0 | | 2.0 | | | | | |
| 20 | 30.0 | 8.0 | 10.0 | 2.0 | 50.0 | | | | | | |
| 21 | 30.0 | 5.0 | 10.0 | 2.0 | | 53.0 | | | | | |
| 22 | 30.0 | 3.0 | 4.0 | 3.0 | | | | 60.0 | | | |
| 23 | 30.0 | 5.0 | 10.0 | 5.0 | | | | | 50.0 | | |
| 24 | 30.0 | 5.0 | 30.0 | 5.0 | | 30.0 | | | | | |
| 25 | 30.0 | 30.0 | 20.0 | 2.5 | 10.0 | | | | | | |
| 26 | 35.0 | 10.0 | 5.0 | 5.0 | | | | | | 45.0 | |
| 27 | 35.0 | 34.0 | 15.0 | 2.0 | 3.0 | 2.0 | | | | | |
| 28 | 35.0 | 50.0 | 2.0 | 8.0 | 5.0 | | | | | | |
| 29 | 35.0 | 5.0 | 15.0 | 5.0 | | | | 40.0 | | | |
| 30 | 40.0 | 13.0 | 2.0 | 15.0 | | | | | | 30.0 | |
| 31 | 40.0 | 15.0 | 20.0 | 5.0 | | | | | 20.0 | | |
| 32 | 60.0 | | 5.0 | 10.0 | | | | | | 25.0 | |
| 33 | 45.0 | 20.0 | 10.0 | 5.0 | | | | | | | 20.0 |
| 34 | 25.0 | 40.0 | 5.0 | 20.0 | 5.0 | | | | | | |

| No. | $SiO_2$ | $Al_2O_3$ | $Y_2O_3$ | $TiO_2$ | $ZrO_2$ | $Nb_2O_5$ | $WO_3$ | $n_d$ | $\nu_d$ |
| --- | --- | --- | --- | --- | --- | --- | --- | --- | --- |
| 1 | | | | 2.5 | 5.0 | 5.0 | 2.57 | 34.2 | |
| | | | | | | | | 1.8849 | |
| 2 | | | | | | | | 1.8449 | 41.7 |
| 3 | | | | 5.0 | | | | 1.8672 | 29.8 |
| 4 | | | | | | 15.0 | | 1.8119 | 40.6 |
| 5 | 8.0 | | | | | | | 1.7583 | 47.6 |
| 6 | | | | 5.0 | 5.0 | 17.0 | | 1.9035 | 31.8 |
| 7 | | | | | | | | 1.8272 | 40.1 |
| 8 | | 16.0 | | | | | | 1.6890 | 52.4 |
| 9 | 23.0 | 2.0 | | | | | | 1.6675 | 52.2 |
| 10 | | | | 10.0 | | | | 1.8566 | 33.0 |
| 11 | | 5.0 | | | | | | 1.7743 | 47.1 |
| 12 | | | | 2.5 | 5.0 | 15.0 | | 1.8718 | 35.6 |
| 13 | | | | 2.5 | 5.0 | 26.0 | | 1.8969 | 29.9 |
| 14 | | | | | | | | 1.8135 | 46.0 |
| 15 | | | 18.0 | | | | | 1.8083 | 44.6 |
| 16 | | | | | | | | 1.8139 | 40.3 |
| 17 | | | | | | | | 1.7583 | 46.9 |
| 18 | | | | | | | | 1.7475 | 50.2 |
| 19 | | | | | | 8.0 | | 1.7973 | 44.6 |
| 20 | | | | | | | | 1.7160 | 47.7 |
| 21 | | | | | | | | 1.7607 | 44.0 |
| 22 | | | | | | | | 1.8191 | 27.2 |
| 23 | | | | | | | | 1.6894 | 52.8 |
| 24 | | | | | | | | 1.7608 | 46.5 |
| 25 | | | | | 5.0 | | 2.5 | 1.7720 | 48.0 |
| 26 | | | | | | | | 1.6667 | 55.3 |
| 27 | | | | | 9.0 | | | 1.7570 | 49.8 |
| 28 | | | | | | | | 1.74568 | 50.0 |
| 29 | | | | | | | | 1.7638 | 36.0 |
| 30 | | | | | | | | 1.6815 | 52.4 |
| 31 | | | | | | | | 1.6880 | 55.4 |
| 32 | | | | | | | | 1.6238 | 55.4 |
| 33 | | | | | | | | 1.6499 | 56.1 |
| 34 | | | 5.0 | | | | | 1.8152 | 44.3 |

In particular, examples of the first embodiment of this invention applied to the $B_2O_3$—$La_2O_3$—$Gd_2O_3$—$Ta_2O_5$—ZnO type optical glass and $B_2O_3$—$La_2O_3$—$Gd_2O_3$—$Ta_2O_5$—CdO system optical glass are shown in Table 2 together with the optical constants and the liquidus temperatures. From the values of the liquidus temperatures, it will be understood that the stabilities of the optical glasses of this invention to devitrification are markedly higher than that of a conventional $B_2O_3$—$La_2O_3$—$Gd_2O_3$—$Ta_2O_5$ system optical glass.

Table 2

| No. | $B_2O_3$ | $La_2O_3$ | $Gd_2O_3$ | $Ta_2O_5$ | ZnO | CdO | $n_d$ | $\nu_d$ | Liquidus Temp. (°C) |
| --- | --- | --- | --- | --- | --- | --- | --- | --- | --- |
| 1 | 22.0 | 33.0 | 10.0 | 20.0 | 15.0 | | 1.8219 | 42.8 | 1055 |

Table 2-continued

| No. | $B_2O_3$ | $La_2O_3$ | $Gd_2O_3$ | $Ta_2O_5$ | ZnO | CdO | $n_d$ | $\nu_d$ | Liquidus Temp. (°C) |
|---|---|---|---|---|---|---|---|---|---|
| 2 | 25.0 | 35.0 | 15.0 | 15.0 | 10.0 |  | 1.8048 | 45.4 | 1045 |
| 3 | 30.0 | 30.0 | 20.0 | 15.0 | 5.0 |  | 1.7763 | 47.1 | 1035 |
| 4 | 30.0 | 30.0 | 20.0 | 5.0 | 15.0 |  | 1.7618 | 49.4 | 985 |
| 5 | 35.0 | 20.0 | 25.0 | 5.0 | 15.0 |  | 1.7284 | 50.9 | 960 |
| 6 | 25.0 | 25.0 | 20.0 | 10.0 | 20.0 |  | 1.7865 | 46.4 | 1015 |
| 7 | 25.0 | 30.0 | 15.0 | 20.0 | 5.0 | 5.0 | 1.8106 | 43.6 | 1085 |
| 8 | 30.0 | 40.0 | 10.0 | 10.0 |  | 10.0 | 1.7836 | 47.4 | 1050 |
| 9 | 30.0 | 20.0 | 10.0 | 5.0 |  | 35.0 | 1.7689 | 45.5 | 940 |
| 10 | 30.0 | 30.0 | 20.0 | 10.0 |  | 10.0 | 1.7788 | 47.5 | 1025 |
| 11 | 40.0 | 10.0 | 10.0 | 5.0 |  | 35.0 | 1.7069 | 49.1 | 930 |

Also, examples of applying the invention to the $B_2O_3$—$La_2O_3$—$Gd_2O_3$—$Ta_2O_5$—ZnO system glass and the $B_2O_3$—$La_2O_3$—$Gd_2O_3$—$Ta_2O_5$—PbO type optical glass are shown in Table 3, which shows the glass could be stably melted without using CdO in the optical constant ranges of 1.72 – 1.85 for $n_d$ and 50 – 27 for $\nu$d, the range of which CdO is required in a conventional glass.

Table 4, which shows that the high refractive and low dispersive optical glass of lower than 1.76 for $n_d$, which could not be obtained in a conventional $B_2O_3$—$La_2O_3$—$Gd_2O_3$—$Ta_2O_5$ system glass because of the increase in the devitrification tendency, could be melted stably.

Table 4

|  | $B_2O_3$ | $La_2O_3$ | $Gd_2O_3$ | $Ta_2O_5$ | BaO | SrO | CaO | MgO | $n_d$ | $\nu_d$ | Liquidus Temp. (°C) |
|---|---|---|---|---|---|---|---|---|---|---|---|
| 1 | 30.0 | 10.0 | 10.0 | 5.0 | 45.0 |  |  |  | 1.6981 | 52.6 | 965 |
| 2 | 30.0 | 30.0 | 10.0 | 15.0 | 15.0 |  |  |  | 1.7558 | 48.0 | 1060 |
| 3 | 40.0 | 20.0 | 10.0 | 10.0 | 20.0 |  |  |  | 1.6937 | 53.5 | 965 |
| 4 | 45.0 | 5.0 | 10.0 | 5.0 | 35.0 |  |  |  | 1.6488 | 57.7 | 920 |
| 5 | 30.0 | 20.0 | 10.0 | 10.0 |  | 30.0 |  |  | 1.7188 | 51.0 | 1055 |
| 6 | 45.0 | 10.0 | 10.0 | 10.0 |  | 25.0 |  |  | 1.6595 | 55.7 | 900 |
| 7 | 40.0 | 30.0 | 10.0 | 5.0 |  |  | 15.0 |  | 1.7117 | 53.4 | 1010 |
| 8 | 55.0 | 10.0 | 5.0 | 10.0 |  |  | 20.0 |  | 1.6207 | 56.3 | 910 |
| 9 | 30.0 | 40.0 | 10.0 | 15.0 |  |  |  | 5.0 | 1.7741 | 47.7 | 1020 |
| 10 | 45.0 | 20.0 | 10.0 | 10.0 |  |  |  | 15.0 | 1.6658 | 54.2 | 1020 |

Table 3

|  | $B_2O_3$ | $La_2O_3$ | $Gd_2O_3$ | $Ta_2O_5$ | ZnO | PbO | $n_d$ | $\nu_d$ | Liquidus Temp. (°C) |
|---|---|---|---|---|---|---|---|---|---|
| 1 | 25.0 | 5.0 | 20.0 | 10.0 | 40.0 |  | 1.7585 | 45.4 | 1045 |
| 2 | 30.0 | 25.0 | 10.0 | 5.0 | 30.0 |  | 1.7463 | 48.5 | 930 |
| 3 | 30.0 | 20.0 | 10.0 | 5.0 |  | 35.0 | 1.8031 | 36.0 | 960 |
| 4 | 30.0 | 30.0 | 10.0 | 15.0 |  | 15.0 | 1.7934 | 40.8 | 1050 |
| 5 | 35.0 | 5.0 | 5.0 | 5.0 |  | 50.0 | 1.7727 | 31.6 | 900 |
| 6 | 40.0 | 10.0 | 10.0 | 5.0 |  | 35.0 | 1.7298 | 40.0 | 985 |

Examples of the $B_2O_3$—$La_2O_3$—$Gd_2O_3$—$Ta_2O_5$-alkaline earth metal oxide-type optical glass are shown in Table 4, which shows that the high refractive and low Then, examples of the second embodiment of this invention are shown in the following table, in which each component is shown in weight percent.

Table 5

| No. | $B_2O_3$ | $La_2O_3$ | $Gd_2O_3$ | ZnO | CdO | PbO | BaO | SrO | CaO | MgO |
|---|---|---|---|---|---|---|---|---|---|---|
| 1 | 24.0 | 15.0 | 11.0 |  | 50.0 |  |  |  |  |  |
| 2 | 25.0 | 10.0 | 15.0 |  | 50.0 |  |  |  |  |  |
| 3 | 30.0 | 2.0 | 2.0 |  |  | 66.0 |  |  |  |  |
| 4 | 30.0 | 10.0 | 5.0 |  |  | 45.0 |  |  |  |  |
| 5 | 30.0 | 40.0 | 10.0 |  | 5.0 |  |  |  |  |  |
| 6 | 35.0 | 40.0 | 20.0 | 5.0 |  |  |  |  |  |  |
| 7 | 35.0 | 45.0 | 10.0 |  | 10.0 |  |  |  |  |  |
| 8 | 35.0 | 2.0 | 2.0 |  |  | 61.0 |  |  |  |  |
| 9 | 35.0 | 5.0 | 10.0 |  |  |  | 50.0 |  |  |  |
| 10 | 30.0 | 15.0 | 30.0 |  | 25.0 |  |  |  |  |  |
| 11 | 35.0 | 35.0 | 10.0 | 10.0 |  |  |  |  |  |  |
| 12 | 35.0 | 25.0 | 5.0 | 15.0 |  |  |  |  |  |  |
| 13 | 35.0 | 38.0 | 25.0 |  | 2.0 |  |  |  |  |  |
| 14 | 35.0 | 10.0 | 10.0 |  |  |  | 45.0 |  |  |  |
| 15 | 40.0 | 30.0 | 5.0 |  |  |  |  | 20.0 |  |  |
| 16 | 20.0 | 10.0 | 10.0 |  |  |  |  | 35.0 |  |  |
| 17 | 40.0 | 50.0 | 5.0 |  |  |  |  |  |  | 5.0 |
| 18 | 40.0 | 2.0 | 2.0 | 56.0 |  |  |  |  |  |  |
| 19 | 45.0 | 25.0 | 10.0 |  |  |  |  |  |  | 20.0 |
| 20 | 45.0 | 5.0 | 10.0 |  |  |  |  | 40.0 |  |  |
| 21 | 40.0 | 25.0 | 5.0 |  |  |  |  | 20.0 |  |  |
| 22 | 40.0 | 20.0 | 5.0 |  |  |  |  | 30.0 |  |  |
| 23 | 40.0 | 35.0 | 10.0 |  |  |  |  |  | 5.0 |  |

Table 5-continued

| No. | $B_2O_3$ | $La_2O_3$ | $Gd_2O_3$ | ZnO | CdO | PbO | BaO | SrO | CaO | MgO |
|---|---|---|---|---|---|---|---|---|---|---|
| 24 | 44.0 | 37.0 | 4.0 | | | 10.0 | | | | |
| 25 | 60.0 | 10.0 | 5.0 | | | | | | 25.0 | |
| 26 | 70.0 | 2.0 | 3.0 | | | | | | 25.0 | |

| No. | $SiO_2$ | $Al_2O_3$ | $Y_2O_3$ | $TiO_2$ | $ZrO_2$ | $Nb_2O_5$ | $WO_3$ | $n_d$ | $\nu_d$ |
|---|---|---|---|---|---|---|---|---|---|
| 1 | | | | | | | | 1.7954 | 42.3 |
| 2 | | | | | | | | 1.7868 | 42.5 |
| 3 | | | | | | | | 1.8135 | 25.9 |
| 4 | | | | 10.0 | | | | 1.8586 | 19.7 |
| 5 | | | | | | 15.0 | | 1.8159 | 40.1 |
| 6 | | | | | | | | 1.7448 | 53.2 |
| 7 | | | | | | | | 1.7516 | 52.1 |
| 8 | | | | | | | | 1.7154 | 47.2 |
| 9 | | | | | | | | 1.6684 | 56.5 |
| 10 | | | | | | | | 1.7629 | 48.6 |
| 11 | | | | | 10.0 | | | 1.7530 | 50.3 |
| 12 | | | 20.0 | | | | | 1.7247 | 52.7 |
| 13 | | | | | | | | 1.7466 | 53.3 |
| 14 | 25.0 | 2.0 | | | | | | 1.6660 | 52.8 |
| 15 | | | | | 5.0 | | | 1.7184 | 49.1 |
| 16 | | 20.0 | | | | | 5.0 | 1.6880 | 50.8 |
| 17 | | | | | | | | 1.7168 | 54.8 |
| 18 | | | | | | | | 1.6679 | 52.0 |
| 19 | | | | | | | | 1.6508 | 57.3 |
| 20 | | | | | | | | 1.6304 | 60.2 |
| 21 | | | | | | | 10.0 | 1.6869 | 52.4 |
| 22 | 5.0 | | | | | | | 1.6529 | 58.5 |
| 23 | | | 10.0 | | | | | 1.7106 | 55.4 |
| 24 | | 1.0 | | | 4.0 | | | 1.6873 | 55.0 |
| 25 | | | | | | | | 1.6290 | 61.1 |
| 26 | | | | | | | | 1.5976 | 62.8 |

Examples of applying the second embodiment of this invention to the $B_2O_3$—$La_2O_3$—$Gd_2O_3$—ZnO system optical glass and the $B_2O_3$—$La_2O_3$—$Gd_2O_3$—CdO system optical glass are shown in Table 6, from which it will be understood that the glasses had excellent optical properties and a greatly increased stability to devitrification in comparison with the conventional $B_2O_3$—$La_2O_3$—ZnO (or CdO) system glass. In particular, the high refractive and low dispersive optical glass of lower than 1.76 for $n_d$, which could not be obtained in the conventional $B_2O_3$—$La_2O_3$—$Gd_2O_3$—$Ta_2O_5$ system caused by the increased tendency of devitrification, could be easily melted.

Also, examples of the $B_2O_3$—$La_2O_3$—$Gd_2O_3$—ZnO system optical glass and the $B_2O_3$—$La_2O_3$—$Gd_2O_3$—PbO system optical glass of this invention are shown in the following table, which shows that the optical glass containing no CdO could be stably melted in the optical constant ranges of 1.68–1.86 for $n_d$ and 53–30 for $\nu_d$, which required CdO as a necessary component in conventional glasses.

Table 7

| | $B_2O_3$ | $La_2O_3$ | $Gd_2O_3$ | ZnO | PbO | $n_d$ | $\nu_d$ | Liquidus Temperature (°C) |
|---|---|---|---|---|---|---|---|---|
| 1 | 30.0 | 15.0 | 5.0 | 50.0 | | 1.7172 | 48.2 | 905 |
| 2 | 35.0 | 30.0 | 10.0 | 25.0 | | 1.7238 | 51.6 | 965 |
| 3 | 40.0 | 25.0 | 5.0 | 30.0 | | 1.6940 | 52.6 | 930 |
| 4 | 30.0 | 10.0 | 10.0 | | 50.0 | 1.8106 | 32.6 | 950 |
| 5 | 35.0 | 15.0 | 30.0 | | 20.0 | 1.7490 | 44.4 | 1055 |
| 6 | 35.0 | 15.0 | 10.0 | | 40.0 | 1.7677 | 37.3 | 1000 |
| 7 | 40.0 | 10.0 | 10.0 | | 40.0 | 1.7308 | 39.3 | 1000 |
| 8 | 45.0 | 5.0 | 10.0 | | 40.0 | 1.6953 | 41.0 | 965 |

Examples of the $B_2O_3$—$La_2O_3$—$Gd_2O_3$-alkaline earth metal oxide system optical glass of this invention are shown in Table 8, which shows that the optical glasses of this invention had excellent optical properties and a markedly increased stability to devitrification in comparison with the conventional $B_2O_3$—$La_2O_3$ alkaline earth metal oxide system optical glasses.

Table 6

| | $B_2O_3$ | $La_2O_3$ | $Gd_2O_3$ | ZnO | CdO | $n_d$ | $\nu_d$ | Liquidus Temperature (°C) |
|---|---|---|---|---|---|---|---|---|
| 1 | 30.0 | 25.0 | 20.0 | 25.0 | | 1.7453 | 50.1 | 980 |
| 2 | 35.0 | 40.0 | 10.0 | 15.0 | | 1.7372 | 52.3 | 1035 |
| 3 | 35.0 | 35.0 | 20.0 | 5.0 | 5.0 | 1.7425 | 52.5 | 1055 |
| 4 | 40.0 | 35.0 | 5.0 | 20.0 | | 1.7066 | 53.2 | 990 |
| 5 | 30.0 | 20.0 | 20.0 | | 30.0 | 1.7669 | 47.7 | 955 |
| 6 | 35.0 | 30.0 | 10.0 | | 25.0 | 1.7430 | 50.3 | 1015 |
| 7 | 35.0 | 25.0 | 30.0 | | 10.0 | 1.7402 | 52.6 | 1060 |

Table 8

| | $B_2O_3$ | $La_2O_3$ | $Gd_2O_3$ | BaO | SrO | CaO | MgO | $n_d$ | $\nu_d$ | Liquidus Temp. (°C) |
|---|---|---|---|---|---|---|---|---|---|---|
| 1 | 35.0 | 10.0 | 10.0 | 45.0 | | | | 1.6764 | 56.1 | 980 |
| 2 | 40.0 | 20.0 | 30.0 | 10.0 | | | | 1.6988 | 56.0 | 1050 |
| 3 | 35.0 | 15.0 | 20.0 | | 30.0 | | | 1.6905 | 55.7 | 1005 |
| 4 | 40.0 | 30.0 | 20.0 | | 10.0 | | | 1.7023 | 55.9 | 1025 |
| 5 | 45.0 | 5.0 | 20.0 | | 30.0 | | | 1.6504 | 59.5 | 980 |
| 6 | 40.0 | 35.0 | 20.0 | | | 5.0 | | 1.7146 | 55.3 | 1065 |
| 7 | 45.0 | 15.0 | 20.0 | | | 20.0 | | 1.6765 | 57.3 | 1025 |
| 8 | 50.0 | 30.0 | 10.0 | | | 10.0 | | 1.6590 | 57.9 | 995 |
| 9 | 35.0 | 25.0 | 30.0 | | | | 10.0 | 1.7125 | 54.4 | 1025 |
| 10 | 40.0 | 30.0 | 20.0 | | | | 10.0 | 1.6939 | 55.5 | 1050 |
| 11 | 45.0 | 30.0 | 10.0 | | | | 15.0 | 1.6638 | 57.0 | 1055 |

In the above examples, the liquidus phase temperature value was obtained by maintaining the glass sample in a conventional inclined devitrification furnace for 30 minutes.

The above-described optical glasses are obtained by melting in a platinum crucible at 1300°–1400°C a mixture of boric acid, lanthanum oxide, gadolinium oxide, tantalum pentoxide, zinc white, cadmium carbonate, litharge, barium carbonate, strontium nitrate, powdered silica, zirconium oxide, aluminum hydroxide, niobium oxide, titanium oxide, tungsten oxide, yttrium oxide, etc., or a mixture of boric acid, lanthanum oxide, gadlinium oxide, zinc white, cadmium carbonate, litharge, barium carbonate, strontium nitrate, calcium carbonate, powdered silica, zirconium oxide, aluminum hydroxide, niobium oxide, tungsten oxide, titanium oxide, yttrium oxide, etc., homogenizing the molten mixture by stirring, defoaming the melt, casting the molten glass in a metallic mold pre-heated to a suitable temperature, and annealing it.

In view of the foregoing, the inventors' inventive glasses can include the following preferred component systems:

A thorium oxide-free glass having a liquidus temperature not greater than 1085°C and having optical constants of 1.62–1.91 for $n_d$ and 59–27 for $\nu d$ consisting essentially of a composition, in weight percent of 18 to 60% $B_2O_3$ + $SiO_2$, a quantity of $B_2O_3$ being present and the content of the $SiO_2$ being 0 to 23%, 0 to 50 % $La_2O_3$, 2 to 50% $Gd_2O_3$, 2 to 30% $Ta_2O_5$, 0 to 50% ZnO, 0 to 53% CdO, 0 to 60% PbO, 0 to 50% BaO, 0 to 45% SrO, 0 to 30% CaO, 0 to 20% MgO, the sum of the ZnO + CdO + PbO + BaO + SrO + CaO + MgO being 2 to 60%, 0 to 16% $Al_2O_3$, 0 to 9% $ZrO_2$, 0 to 10% $TiO_2$, 0 to 26% $Nb_2O_5$, 0 to 15% $WO_3$, and 0 to 18% $Y_2O_3$;

a thorium oxide-free optical glass wherein the glass has the composition, in weight percent, of 18 to 40% $B_2O_3$, 10 to 45% $La_2O_3$, 2 to 35% $Gd_2O_3$, 2 to 25% $Ta_2O_5$, 0 to 25% ZnO, 0 to 30% CdO, the sum of the ZnO + CdO being 2 to 30%;

a thorium oxide-free optical glass wherein the glass has a composition, in weither percent, of 22 to 40% $B_2O_3$, 0 to 30% $La_2O_3$, 2 to 30% $Gd_2O_3$, 2 to 30% $Ta_2O_5$, 25 to 40% ZnO, 0 to 20% PbO, the sum of the ZnO + PbO being 25 to 45%;

a thorium oxide-free optical glass wherein the glass has a composition, in weight percent, of 25 to 45% $B_2O_3$, 0 to 40% $La_2O_3$, 2 to 30% $Gd_2O_3$, 2 to 20% $Ta_2O_5$, 0 to 40% BaO, 0 to 35% SrO, 0 to 20% CaO, 0 to 20% MgO, the sum of the BaO + SrO + CaO + MgO being 2 to 40%;

a thorium oxide-free optical glass having optical constants of 1.77– 1.85 for $n_d$ and 51–40 for $\nu d$ consisting essentially of a composition, in essentially of a composition, in weight percent, of 0 to 8% $SiO_2$, 21 to 30% $B_2O_3$, 0 to 3% $Al_2O_3$, 25 to 40% $La_2O_3$, 2 to 25% $Gd_2O_3$, 2 to 20% NnO, the sum of the CdO + PbO + CaO + BaO + SrO + CaO + MgO being 0 to 10%, 0 to 6% $ZrO_2$, 2 to 15% $Ta_2O_5$, 0 to 12% $Nb_2O_5$, 0 to 6% $WO_3$, 0 to 3% $TiO_2$ and 0 to 10 $Y_2O_3$;

a thorium oxide-free optical glass having optical constants of 1.59–1.86 for $n_d$ and 62–19 for $\nu d$ consisting essentially of a composition, in weight percent, of 24 to 70% $B_2O_3$ + $_{SiO2}$, a quantity of $B_2O_3$ being present and the content of said $SiO_2$ being 0 to 25%, 1 to 50% $La_2O_3$, 2 to 50% $Gd_2O_3$, 0 to 56% ZnO, 0 to 61% CdO, 0 to 66% PbO, 0 to 50% BaO, 0 to 40% SrO, 0 to 25% CaO, 0 to 20% MgO, the sum of the ZnO + CdO + PbO + BaO + SrO + CaO + MgO being 2 to 66%, 0 to 20% $Al_2O_3$, 0 to 10% $ZrO_2$, 0 to 10% $TiO_2$, 0 to 15% $Nb_2O_5$, 0 to 10% $WO_3$, and 0 to 20% $Y_2O_3$;

a thorium oxide-free optical glass wherein the glass has a composition, in weight percent, of 24 to 45% $B_2O_3$, 1 to 45% $La_2O_3$, 2 to 30% $Gd_2O_3$, 0 to 25% ZnO, 0 to 30% CdO, the sum of the ZnO + CdO being 2 to 30%;

a thorium oxide-free optical glass wherein the glass has a composition, in weight percent, of 25 to 45% $B_2O_3$, 1 to 35% $La_2O_3$, 2 to 25% $Gd_2O_3$, 25 to 40% ZnO, 0 to 20% PbO, the sum of the ZnO + PbO being 25 –45%;

a thorium oxide-free optical glass wherein the glass has the composition, in weight percent, of 30 to 50% $B_2O_3$, 1 to 45% $La_2O_3$, 2 to 30% $Gd_2O_3$, 0 to 40% BaO, 0 to 35% SrO, 0 to 25% CaO, 0 to 20% MgO, the sum of the BaO + SrO + CaO + MgO being 2 to 40%;

a thorium oxide-free optical glass wherein the glass has the composition, in weight percent, of 1 to 10% $SiO_2$, 28 to 37% $B_2O_3$, 0 to 3% $Al_2O_3$, 27 to 45% $La_2O_3$, 2 to 15% $Gd_2O_3$, 0 to 10% $Y_2O_3$, 2 to 15% ZnO, the sum of the CdO + PbO + SrO + CaO + MgO being 0 to 10%, the sum of the $Nb_2O_5$ + $WO_3$+ $TiO_2$ being 0 to 3%, and 0 to 8% $ZrO_2$;

a thorium oxide-free optical glass as in the preceding glass wherein the $Y_2O_3$ is 2 to 10%;

a thorium oxide-free optical glass wherein the glass has the composition, in weight percent, of 1 to 15% $SiO_2$, 25 to 41% $B_2O_3$, 0 to 8% $Al_2O_3$, 10 to 41% $La_2O_3$, 2 to 25% $Gd_2O_3$, 0 to 10% $Y_2O_3$, the sum of the ZnO + CaO being 2 to 20%, the sum of the CdO + PbO + BaO + SrO + MgO being 0 to 10% the sum of the $Ta_2O_5$ + $Nb_2O_5$ + $WO_3$ + $TiO_2$ being 0 to 3%, and 0 to 5% $ZrO_2$; and a thorium oxide-free optical glass wherein the glass has the composition, in weight percent, of 1 to 20% SiO, 25 to 41% $B_2O_3$, 0 to 10% $Al_2O_3$, 2 to 25% $La_2O_3$, 2 to 15% $Gd_2O_3$, 0 to 10% $Y_2O_3$, the sum of the BaO + SrO + CaO + MgO being 10 to 50%, the sum of ZnO + CdO + PbO being 0 to 10%, the sum of the $Ta_2O_5$ + $Nb_2O_5$ + $WO_3$ + $TiO_2$ being 0 to 3%, and 0 to 8% $ZrO_2$.

The optical glasses of this invention are stable to devitrification even if they do not contain $ThO_2$ which is poisonous to humans and are colorless and transparent as well as excellent in chemical durability. In particular, the optical glass of this invention has optical constants of 1.72–1.85 for $n_d$ and 50–27 for $\nu_d$ or of 1.68–1.86 for $n_d$ and 53–30 for $\nu_d$ without the necessity of CdO.

While the invention has been described in detail and in terms of specific embodiments, it will be apparent that modifications and changes can be made therein without departing from the spirit and scope thereof.

What is claimed is:

1. A thorium oxide-free glass having a liquidus temperature not greater than 1085°C and having optical constants of 1.62–1.91 for $n_d$ and 59–27 for $\nu d$ consisting essentially of a composition in weight percent of 18 to 60% $B_2O_3$ + $SiO_2$, a quantity of $B_2O_3$ being present and the content of said $SiO_2$ being 0 to 23%, 0 to 50% $La_2O_3$, 2 to 50% $Gd_2O_3$, 2 to 30% $Ta_2O_5$, 0 to 50% ZnO, 0 to 53% CdO, 0 to 60% PbO, 0 to 50% BaO, 0 to 45% SrO, 0 to 30% CaO, 0 to 20% MgO, the sum of said ZnO + CdO + PbO + BaO + SrO + CaO + MgO being 2 to 60%, 0 to 16% $Al_2O_3$, 0 to 9% $ZrO_2$, 0 to 10% $TiO_2$, 0 to 26% $Nb_2O_5$, 0 to 15% $WO_3$, and 0 to 18% $Y_2O_3$.

2. The thorium oxide-free optical glass as described in claim 1, wherein said glass has the composition, in weight percent, of 18 to 40% $B_2O_3$, 10 to 45% $La_2O_3$, 2 to 35% $Gd_2O_3$, 2 to 25% $Ta_2O_5$, 0 to 25% ZnO, 0 to 30% CdO, the sum of said ZnO + CdO being 2 to 30%.

3. The thorium oxide-free optical glass as described in claim 1, wherein said glass has the composition, in weight percent, of 22 to 40% $B_2O_3$, 0 to 30% $La_2O_3$, 2 to 30% $Gd_2O_3$, 2 to 30% $Ta_2O_5$, 25 to 40% ZnO, 0 to 45% PbO, the sum of said ZnO + PbO being 25 to 45%.

4. The thorium oxide-free optical glass as described in Claim 1, wherein said glass has the composition, in weight percent, of 25 to 45% $B_2O_3$, 0 to 40% $La_2O_3$, 2 to 30% $Gd_2O_3$, 2 to 20% $Ta_2O_5$, 0 to 40% BaO, 0 to 35% SrO, 0 to 20% CaO, 0 to 20% MgO, the sum of said BaO + SrO + CaO + MgO being 2 to 40%.

5. A thorium oxide-free optical glass having optical constants of 1.77–1.85 for $n_d$ and 51–40 for $\nu d$ consisting essentially of a composition in weight percent of 0 to 8% $SiO_2$, 21 to 30% $B_2O_3$, 0 to 3% $Al_2O_3$, 25 to 40% $La_2O_3$, 2 to 25% $Gd_2O_3$, 2 to 20% ZnO, the sum of said CdO + PbO + CaO + BaO + SrO + CaO + MgO being 0 to 10%, 0 to 6% $ZrO_2$, 2 to 15% $Ta_2O_5$, 0 to 12% $Nb_2O_5$, 0 to 6% $WO_3$, 0 to 3% $TiO_2$ and 0 to 10 $Y_2O_3$.

6. A thorium oxide-free optical glass having optical constants of 1.59–1.86 for $n_d$ and 62–19 for $\nu$ d consisting essentially of a composition, in weight percent, of 24 to 70% $B_2O_3$ + $SiO_2$, a quantity of $B_2O_3$ being present and the content of said $SiO_2$ being 0 to 25%, 1 to 50% $La_2O_3$, 2 to 50% $Gd_2O_3$, 0 to 56% ZnO, 0 to 61% CdO, 0 to 66% PbO, 0 to 50% BaO, 0 to 40% SrO, 0 to 25% CaO, 0 to 20% MgO, the sum of said ZnO + CdO + PbO + BaO + SrO + CaO + MgO being 2 to 66%, 0 to 20% $Al_2O_3$, 0 to 10% $ZrO_2$, 0 to 10% $TiO_2$, 0 to 15% $Nb_2O_5$, 0 to 10% $WO_3$, and 0 to 20% $Y_2O_3$.

7. The thorium oxide-free optical glass as described in claim 6, wherein said glass has the composition, in weight percent, of 24 to 45% $B_2O_3$, 1 to 45% $La_2O_3$, 2 to 30% $Gd_2O_3$, 0 to 25% ZnO, 0 to 30% CdO, the sum of said ZnO + CdO being 2 to 30%.

8. The thorium oxide-free optical glass as described in claim 6, wherein said glass has the composition, in weight percent, of 25 to 45% $B_2O_3$, 1 to 35% $La_2O_3$, 2 to 25% $Gd_2O_3$, 25 to 40% ZnO, 0 to 45% PbO, the sum of said ZnO + PbO being 0 to 45%.

9. The thorium oxide-free optical glass as described in claim 6, wherein said glass has the composition, in weight percent, of 30 to 50% $B_2O_3$, 1 to 45% $La_2O_3$, 2 to 30% $Gd_2O_3$, 0 to 40% BaO, 0 to 35% SrO, 0 to 25% CaO, 0 to 20% MgO, the sum of said BaO + SrO + CaO + MgO being 2 to 40%.

10. The thorium oxide-free optical glass as described in claim 6, wherein said glass has the composition, in weight percent, of 1 to 10% $SiO_2$, 28 to 37% $B_2O_3$, 0 to 3% $Al_2O_3$, 27 to 45% $La_2O_3$, 2 to 15% $Gd_2O_3$, 0 to 10% $Y_2O_3$, 2 to 15% ZnO, the sum of said CdO + PbO + BaO + SrO + CaO + MgO being 0 to 10%, the sum of said $Nb_2O_5$ + $WO_3$ + $TiO_2$ being 0 to 3%, and 0 to 8% $ZrO_2$.

11. The thorium oxide-free optical glass as described in claim 10, wherein said $Y_2O_3$ is 2 to 10%.

12. The thorium oxide-free optical glass as described in claim 6, wherein said glass has the composition, in weight percent, of 1 to 20% $SiO_2$, 25 to 41% $B_2O_3$, 0 to 10% $Al_2O_3$, 2 to 25% $La_2O_3$, 2 to 15% $Gd_2O_3$, 0 to 10% $Y_2O_3$, the sum of said BaO + SrO + CaO + MgO being 10 to 50%, the sum of said ZnO + CdO + PbO being 0 to 10%, the sum of said $Ta_2O_5$ + $Nb_2O_5$ + $WO_3$ + $TiO_2$ being 0 to 3%, and 0 to 8% $ZrO_2$.

* * * * *